United States Patent Office 3,358,062
Patented Dec. 12, 1967

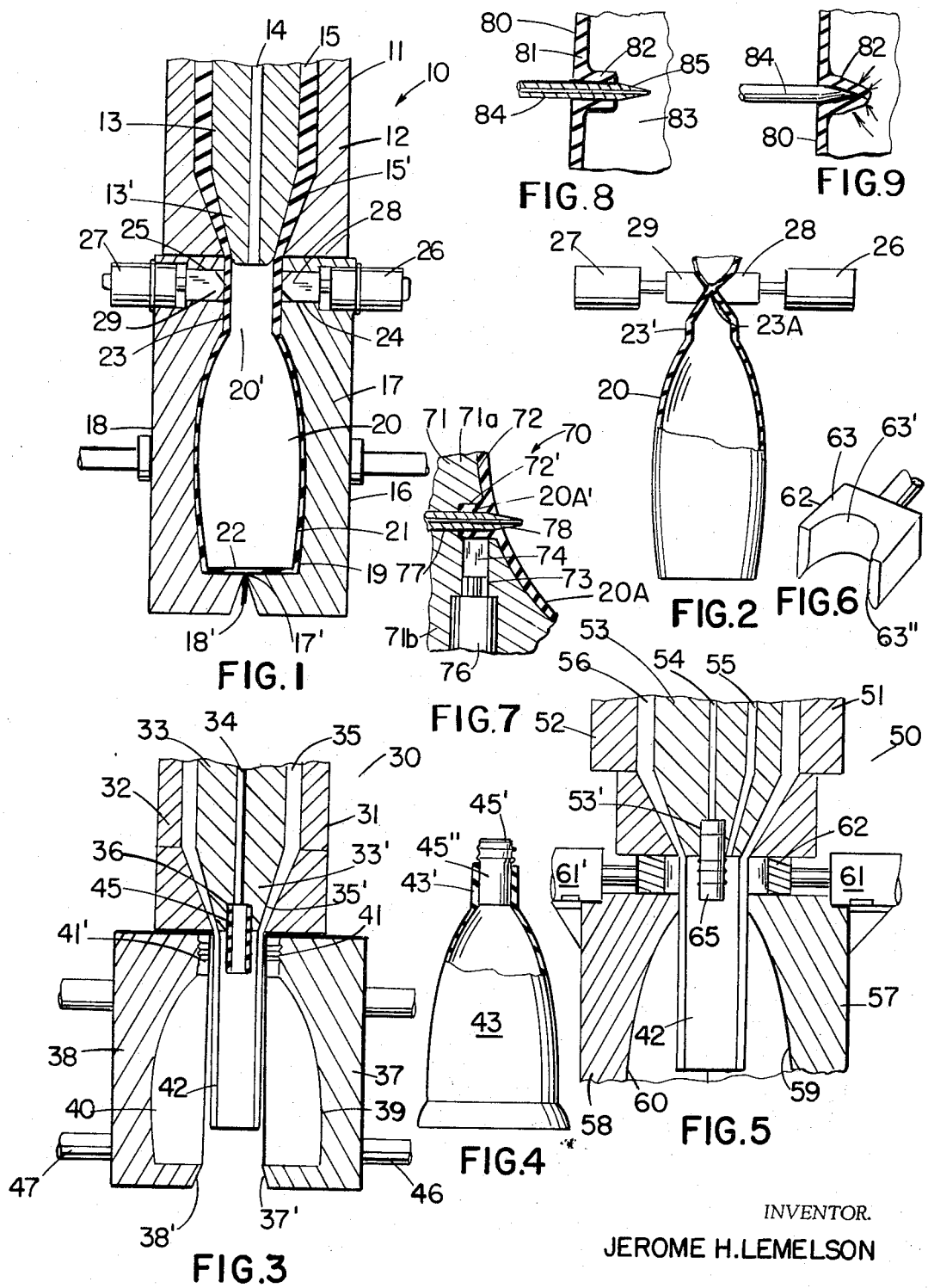

3,358,062
MOLDING METHOD FOR MAKING
SEALED ARTICLES
Jerome H. Lemelson, 85 Rector St.,
Metuchen, N.J. 08840
Filed June 16, 1965, Ser. No. 464,400
10 Claims. (Cl. 264—96)

This invention relates to methods for molding and is a continuation-in-part of copending application Ser. No. 187,393, filed on Apr. 13, 1962, for Welding Method and Articles, and now abandoned. In particular, this invention is concerned with methods for molding thin-walled hollow articles and sealing same preferably during or immediately after molding so as to permit the retention of a product therein or retain internal pressurization for the purposes of supporting the walls of the articles. This is also a continuation-in-part of my application Ser. Nos. 207,357, and 734,340, now Patent No. 3,173,175.

In molding various hollow articles of thermoplastic materials such as fluid containers applicable for the packaging of various products, toys or the like, it is frequently desirable to make the walls of the article as thin as possible so as to allow substantial savings in the material of which the article is molded. Such articles, however, suffer various shortcomings which may include the inability of the material to be self-supporting particularly if molded in thin-walled sections and also the inability of the wall or walls of the article to support and retain a closure in assembly therewith in a manner such as to be reusable. Various thermoplastic resins such as plasticized polyvinylchloride, medium and low density polyethylene, certain formulations of polyurethane, copolymers of such materials as ethylene vinyl acetate and the like are inherently incapable of self-support in moderately thin-walled sections. Yet their properties are such that they would ordinarily be well suited for the fabrication of a variety of articles of manufacture if they are internally supported so as to substantially maintain their shape during use. Articles fabricated of such flexible materials are generally injection molded to shape but are rarely blow molded or rotationally molded in thin-walled cross sections as they are incapable of self support during or immediately after molding. Various articles are fabricated of flexible materials which are defined in shape by means of inflation but these articles are generally formed by dip molding or by heat sealing a plurality of sheets of flexible plastic material together and thereafter inflating same.

Accordingly, it is a primary object of this invention to provide a new and improved method for fabricating hollow thin-walled articles of flexible plastic material.

Another object is to provide an improved method for fabricating thin-walled hollow articles of flexible plastic material and simultaneously with the procedure of molding, pressurizing and sealing same to retain the pressure prior to removal of the article from the mold so as to provide an article with internally supported flexible walls.

Another object is to provide novel methods for molding composite articles.

Another object is to provide improved methods for sealing thin-walled articles made of thermoplastic material.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIG. 1 is a side view in cross section of a multiple part blow mold and an extrusion head in operative relation therewith shown feeding molding material to the mold;

FIG. 2 is a view of part of the apparatus of FIG. 1 including means for closing the molded article after molding same;

FIG. 3 is a side view in cross section of a modified form of the apparatus of FIG. 1 prior to closure of the mold and includes means for retaining a fitting to become part of the molded article;

FIG. 4 is a side view in partial section of the article molded in the apparatus of FIG. 3;

FIG. 5 is a partial view in cross section of a modified form of the apparatus of FIG. 3;

FIG. 6 is an isometric view of a clamping component of the apparatus of FIG. 5;

FIG. 7 is a cross sectional view of a fragment of a modified form of the apparatus of FIG. 1 showing needle injection and sealing means;

FIG. 8 is a fragmentary view in section of a modified form of the invention in which sealing of the article is effected by internal pressure;

FIG. 9 is a view of FIG. 8 after partial removal of the injection needle.

In FIG. 1 is shown a molding apparatus 10 operative for molding hollow thin-walled articles by the molding technique known as blow molding and having the additional features of being operative to pressurize the interior of the blow molded article and seal same so as to retain pressurized fluid therein for the purposes of supporting the walls of the article. As stated, various flexible polymers are not ordinarily employed in the procedures of blow and rotational molding as they are incapable of self support in relatively thin wall moldings. Apparatus of the type illustrated provides for the molding of medium and thin-walled plastic articles of relatively flexible material such as plasticized polyvinylchloride, low density polyethylene, copolymers such as ethylene vinyl acetate (EVA), synthetic or natural rubbers and the like by blow or rotational molding in which the molding material is retained against the wall of the mold by the application of sufficient internal pressure thereto during molding and, after solidifying to a defined shape, the article is sealed or automatically provided with a valve for pressurizing same, prior to its removal from the mold. Various containers, displays, cushioned articles and toys may be so fabricated with little, if any, manual labor required by means of the apparatus illustrated in the drawings.

The molding apparatus 10 of FIG. 1 includes an extrusion head 11 terminating means (not shown), such as a plastics extruder, for supplying extrusion material of the type hereinabove described to an annular passageway 15 in the extrusion head for downwardly extruding a so-called parison or flexible tubular member of the type illustrated in FIG. 3, which is blown by the application of internal pressure to the parison to conform to the walls of a cavity of a mold. The mold 16 of FIG. 1 is illustrated in part only and is shown aligned with the end of the extrusion head 11 with mold sections 17 and 18 thereof closed against the parison which is blown to the shape of an article 20 conforming to the walls 19 of the cavity defined by the mold. Conventional blow molding apparatus involves movement of the two or more mold sections in a longitudinal direction towards the extrusion head while said mold sections are separated and, when the downwardly extruding tubular formation or parison of plastic material has reached a desired length, movement of said mold sections together, to attain a position such as in FIG. 1, so as to clampingly engage and close off the lower end of the parison permitting it to be expanded by internally applied gas pressure to force the walls thereof to conform to the walls of the cavity of the mold sections.

Inflation or blowing of the parison may be effected by introducing inflation gas through a needle penetrating y wall of the parison or through the mandrel of the xtruder which is coupled to the parison. In FIG. 1, the xtrusion mandrel 13 is provided with a passageway 14 extending axially therethrough which passageway is connected to a source of inflation gas under pressure and means for controlling same to blow the parison into the closed mold. The tapered end 13' of the mandrel may be moved downwardly upon closure of the mold sections 17 and 18 against the parison so as to cut off the upper end of the parison and maintain a seal with the opening in the upper end of the mold during blowing or may be retained in a fixed attitude such as that illustrated in FIG. 1 during the entire molding operation unless it is desired to program control the movement of said mandrel for controlling the wall thickness of the parison. Notation 15' refers to the lower tapering conical portion of the passageway 15 through which molding material is fed and notation 12 to the outer wall of the extrusion head 11 surrounding the mandrel 13.

Shown retained within respective receptacle portions of the upper walls of mold members 17 and 18 are a pair of lineal actuators 26 and 27 which may comprise solenoids, lineal motors or fluid cylinders operative to respectively project pinch-off blades or bars 28 and 29 from retracted positions in passageways 24 and 25 provided in the portions of the mold defining the neck 23 of the molding, for the purpose of sealing the molded article 20 as illustrated more clearly in FIG. 2. If the interior of the molded article 20 is pressurized or contains a fluent product delivered thereto through passageway 14 of the mandrel 13, said fluid will be sealed within the article upon projection of bars 28 and 29 and their operation to compressively engage and close the walls of the neck portion 23 of the molding against each other. If the material comprising the upper portion 23 of the molding is semi-molten resulting from its condition during molding and is a thermoplastic resin, the portions thereof engaged and closed against each other by the compressive action of members 28 and 29 may be fused or welded together in a suitable bond upon solidification of said material. In certain instances, members 28 and 29 may be heated or may at least in part comprise dies operative to weld the container walls together by means of heat generated therein, ultrasonic energy or radio frequency energy applied thereto as they are moved toward each other against the neck or narrow portion of the molding. Upon effecting the closure seal which is defined in FIG. 2 by the notation 23A, the members 28 and 29 may be operative to shear or pinch off material above the seal so as to sever it from the filled or inflated article 20 and to thereafter retract with the opening of the mold halves so that the container or inflated article may be removed from the mold. The various operations hereinabove described may be sequentially controlled by an suitable means such as a multicircuit, self-recycling timer operatively connected to various servos and solenoids for effecting mold movement, molding material flow control, flow of inflation gas or filling material, operation of the described pinch-off or welding devices, etc.

The bottom wall 22 of the molded article is formed against the bottom wall of the mold cavity and is trimmed flat by respective tapering portions 17' and 18' of mold sections 17 and 18 which define the inner edges of the bottom wall of the mold cavity.

In FIG. 3 is shown a modified form of the invention in which a valve is automatically inserted within the neck of and attached to a molded article during the molding thereof which valve may be utilized for inflating the article or as closure means therefor. The molding apparatus 30 includes an extrusion head 31 shown aligned with separated mold sections 37 and 38 and also shown downwardly extruding a flexible plastic tube 42 operative to define a parison capable of being blown or expanded into the cavity sections 39 and 40 of molds 37 and 38. The extrusion head 31 includes an outer wall 32 defining an annular passageway 35 with a mandrel 33. The tapering end 33' of the mandrel 33 defines a conically tapering passageway portion 35' from the end of which downwardly extrudes the semi-molten tubular formation 42. The lower end of the tapering portion 33' of mandrel 33 is provided with a cavity 36 therein in alignment with the central passageway 34 of the mandrel and a cylindrical, preformed tubular formation 45 is disposed within the cavity 36 and held therein by friction or other means positioning the lower portion of member 45 downwardly into the tubular formation 42. When the tubular formation 42 has extended in length so that its lower end is aligned with or beyond the pinch-off portions 37' and 38' of mold sections 37 and 38, the mold sections are moved towards each other by respective servo means (not shown) connected to mold support rods 46 and 47 and the upper portions 41 and 41' of the mold cavity wall are caused to engage the upper wall of the extrusion 42 and compress same against the tubular formation 45. If the material of which tube 45 is made is a thermoplastic material it may be fusion welded to the upper wall of the extrusion or parison 42 by mere compression of the semi-molten material thereagainst. However, the walls of portions 41 and 41' of mold sections 37 and 38 may be heated or provided with auxiliary means for effecting said welding of the neck of 42 and member 45. If member 45 is metal or other material which will not fusion weld to the parison material, it may be frictionally retained in place by compressing the material of the extrusion thereagainst and solidifying same in situ thereon. The walls of portions 41 and 41' of the mold cavity are shown serrated or irregularly formed to enhance the welding operation. They may also be formed with circular or helical cavities therein operative for providing one or more circular beaded formations or threads in the exterior surface of the wall of the neck of the parison formed around tubular member 45 for securing a closure or other means thereto.

Member 45 is shown as a short length of cylindrical tubing although it may comprise any suitable shape and may also include a plurality of assembled parts. The member 45 may be manually or automatically inserted into the cavity or recess 36 in the end of mandrel 33 and is preferably aligned with passageway 34 as shown as that inflation gas and/or other fluent material may be passed directly therethrough from the passageway 34 into the interior of the parison or article blow molded in the mold. The member 45 may also be molded in situ at the end of the mandrel 33 by means not shown or extruded to shape by feeding material therefor through one or more additional passageways in the mandrel. If extruded to shape, member 45 may be pinched off or otherwise severed from the mandrel prior to or as the blown article attached thereto is removed from the mold. The member 45 may also comprise a tube longer than that illustrated and extending to near the bottom of the blown container and operative as part of a pump for dispensing fluid from said container or may comprise a tube assembled with a fitting such as 45 or other suitable device held in the mandrel and secured to the neck of the blown container by the means described.

If the article blown in the mold of FIG. 3 is made of a flexible polymer or copolymer as described, the rigid tube 45 may be utilized as an inflation means or means for retaining an inflation valve therein for easily inflating the article.

FIG. 4 illustrates a molded article 43 having the neck portion 43' thereof welded or frictionally secured to the lower portion 45'' of a modified form of tubular fitting 45' by the means illustrated in FIG. 3. The upper end of the fitting 45' is shown beaded or threaded for receiving a closure such as a cap or plug operative to seal off the interior volume of the molded article 43.

FIG. 5 illustrates a modified form of the invention in which clamping means of the type illustrated in FIGS. 1 and 2 are provided to compressively engage and seal the neck portion of the parison against a plug or tube of the type illustrated in FIG. 3. The apparatus 50 includes an extrusion head 51 operative to downwardly extrude a tubular formation 42 of molding material, which formation is utilized as a parison disposed between mold sections 57 and 58 and is so defined when the mold sections are closed against the tubular formation. The mandrel 53 which is surrounded by the outer wall 52 of the head 51 is provided with a centrally disposed passageway 54 and a second passageway 55 extending parallel to passageway 54 both of which passageways terminate at the lower end of the mandrel. Notation 65 refers to the tubular neck formation, valve or plug which is adapted to be integrally secured to the neck of the blown article by clamping engagement of the upper portion of the downwardly extruding tube or parison 42 thereagainst. Such deformation of the extrusion 42 against the outer wall of 65 is effected in FIG. 5 by means of lineal solenoids or fluid cylinders 61 and 61' both of which are respectively supported by the upper walls of the mold sections 57 and 58 and each operative to advance respective clamping and welding dies 62 and 62' against opposite wall portions of the extrusion to force same against member 65 and weld or mold same to conform thereto. Details of the forming die 62 are illustrated in FIG. 6. Each die includes a head 63 having a surface 63' operative to form or shape the wall of the neck of the parison in compressing same against the member 65 held in the end of the extrusion mandrel 53. In FIG. 6 the surface 63' is somewhat semi-cylindrical and outwardly tapering along the lower portion thereof. Two such semi-cylindrical surfaces may be operative to provide a cylindrical neck portion of the blow molding.

In FIG. 5 the plug or valve 65 is maintained in a recess or cavity 53' in the end of the mandrel 53 of the extrusion die by means of suction pressure applied to the centrally disposed passageway 54 extending through the mandrel and communicating with recess 53'. If member 65 is solid or is capped, suction pressure applied to passageway 54 will hold member 65 in place after its insertion into the recess 53' and during forming and filling of the parison.

Fluid pressure operative to blow mold the parison to the shape of an article is derived from gas directed through auxiliary passageway 55 which terminates at the end of mandrel 53 immediately adjacent the recess or cavity 53' therein holding member 65 in place. Thus pressure is maintained within the blown parison until the neck thereof is compressively engaged against the outer surface of member 65 by means of die 62.

FIG. 7 illustrates a modified form of the invention utilizing an injection needle to penetrate the wall of a parison, formed as described or otherwise for the purpose of inflating and/or pressurizing same. The molding apparatus 70 of FIG. 7 includes a mold having a mold section 71 which cooperates with one or more additional mold sections as described in defining a molding cavity having a surface 72 for defining the shape of an article which is blow molded or otherwise disposed against said wall when the mold is operatively closed. Notation 20A refers to that portion of the molded article disposed against the portion of the wall surface 72 illustrated in FIG. 7.

The mold portion 71 is provided with a passageway 77 in the form of an elongated cylindrical bore in which an injection needle 78 is movable from a retracted position to a position whereby it will penetrate the wall of the molding 20A as illustrated. Aligned with bore 77 is a sub-cavity 72' extending inwardly from the main cavity wall surface 72. The sub-cavity 72' has a diameter larger than the diameter of the injection needle 78 but no greater than the wall thickness of the molded article 20A. The sub-cavity 72' serves to permit flow of a small amount 20A' of the molding material of which the molded body 20A is formed to flow therein and to form as a short tubular formation supported by the needle 78 until the latter is withdrawn. Upon wtihdrawal of said needle from the blow molding, preferably while the material of the molding is in a semi-molten condition, the tubular formation 20A' is pinched closed while retaining the gas volume interior of the molding in a pressurized condition and, upon solidification of the molding material, a hollow molded shape of the type described is derived in which the walls thereof are supported by the pressurized gas retained within said hollow body.

Pinching to close the formation 20A' may be effected by the rocking or pivotal movement of either the upper portions 71a or the lower portions 71b of the mold section 71 with respect to the other so as to close against the tubular formation 72'. In FIG. 7, a pinch-off device is provided in the form of a blade or tool 74 movable in a bore 73 communicating with the sub-cavity 72' and operated to advance and retract by means of a lineal actuator 76 such as a solenoid or fluid cylinder ram mounted on or within a bore in the lower portion 71b of the mold section 71. The lineal actuator 76 is preferably controlled in its operation to project tool tip 74 just as the injection needle 78 is being withdrawn and to close the opening in the tubular formation 20A' against the end portion of the needle 78 as it is withdrawn to prevent loss of pressure from the interior volume of the molding 28. Once the material of which article 20A is molded solidifies, the molding may be removed from the mold in a pressurized condition. Here again, the operations of forming the parison, positioning the parison between mold sections, closing the mold sections against the parison, movement of injection needle 78 to penetrate the wall of the molding, inflation or pressurization of the parison, withdrawal of the needle and simultaneous advancement of closure tool 74 to close the opening defined by tubular formation 20A, opening of the mold and removal of the molding, etc. may all be effected by a single sequential controller such as a multi-circuit timer having respective control circuits extending to the various controls for the valves and servos effecting the described cycle of molding actions.

The apparatus illustrated in FIG. 7 may utilize a parison which is downwardly extruded and inflated solely by means of the needle 78 to expand into the closed mold or blown to shape by auxiliary means such as the means illustrated in FIGS. 1, 3 or 5.

FIGS. 8 and 9 illustrate another means for forming and internally pressurizing a hollow body with gas for the purpose of inflating and supporting the walls thereof. The wall 81 of the hollow body 80 is preferably molded by blow molding or rotational molding as described and has a tubular formation 82 molded integral therewith and extending into the inside volume 83 of the body 80 which formation defines a passageway through which inflation gas may be flowed. The tubular formation 82 may be formed by a projecting portion of the mold and/ or an injection nozzle disposed in the mold wall. In FIG. 7 a fluid injection nozzle 84 is shown disposed in the tubular formation 82 of the molding in which it has either been placed after molding or disposed projecting from the mold cavity wall so as to permit the formation of tubular portion 82 during molding. If portion 82 is molded on the projecting portion of nozzle 84, it will cover the end 85 of said nozzle. To permit communication between the nozzle and the interior volume 83, the nozzle 84 may be moved inwardly to penetrate the end of formation 82 so as to permit injection of gas therethrough under sufficient pressure to cause the walls of the tubular formation to collapse as the nozzle 84 is withdrawn.

Sealing of the passageway defined by formation 82 may be effected by providing the material thereof in a semi-molten condition either as the result of its condion as molded or by applying heat thereto by heating the nozzle 84. Thus after injecting a predetermined quantity of gas through nozzle 84 into volume 83, the nozzle 84 is slowly withdrawn permitting the walls of the tubular member to collapse and become welded together upon curing or solidification thereof. Suction or reduced pressure may be applied to the nozzle 84 as it is withdrawn to create a greater pressure differential between the exterior and interior of the tubular formation and increase the force acting to collapse same and cause the walls thereof to be forced together.

In another form of the invention, hollow articles which are internally gas pressurized to support the walls thereof may be formed of suitable molding material such as thermoplastic or thermosetting resin by providing a multiple part mold which may be sealed upon assembly to prevent gas leakage therefrom. A predetermined quantity of rotational molding material such as powdered or liquid plastic may be injected or otherwise disposed to partially fill the mold cavity prior to or after assembly of the mold and, upon closure of the mold, a predetermined quantity of gas such as air, nitrogen or other suitable gas is injected into said cavity to occupy the remaining cavity space. Thereafter, the mold is rotated and otherwise moved to cause molding material to completely coat the interior surface of the mold and to solidify thereon forming a totally closed hollow body which encapsulates the pressurized gas disposed in the molding cavity. The hollow molding may be removed from the mold cavity upon complete fusion or solidification of the molding material depending on the desired effects. For example, if the molding material is semi-molten or soft when the mold is opened, the molded article may be caused to predeterminately inflate, by gas under pressure which is molded therein; when the body is removed from the mold. The degree of inflation and shape of the article may be controlled by controlling such variables as pressure of the gas in the mold, temperature of the mold wall, time at which the mold is opened and degree as well as speed of opening of the mold. If predetermined portions of the mold wall are cooled faster than other portions or while other portions are heated or movement of the mold is controlled so as to form portions of the article molded therein with greater and more rigid wall sections than other portions, then the shape of the article resulting from inflation of the walls, may be controlled and predeterminedly varied with certain thinner or more flexible or molten wall portions inflating or expanding greater than the heavier or more rigid wall portions present during inflation.

In still another form of the invention, a hollow article of plastic may be formed in a mold by rotational molding. Prior to completely forming the article but after a completely enclosed hollow shell has been molded, an injection needle is caused to penetrate the wall of said shell. Gas is injected under pressure into said hollow body and caused to pressurize same. Thereafter molding is continued in which fluent molding material from the original charge and/or a new charge thereof injected through said needle is caused to coat and solidify on the inside surface of the body shell already molded and over the end of the injection needle to completely seal the inside of the body and retain the gas therein. The needle may be completely removed from the wall of the body and the body from the mold prior to or after complete solidification of the plastic.

Other methods and apparatus for effecting control of the shape of an article formed or defined by inflation are also noted and may be utilized per se or in combination with the procedures described above or hereafter to provide new and improved articles of manufacture. These include:

(a) Forming a hollow article by rotationally molding plastic, ceramic or metal in a manner to provide different portions of the wall of the body of different thickness. This may be effected by controlling movement of the mold to permit molding material to solidify to greater depth along predetermined portions of the molding cavity such as the lowermost portion thereof than the depth or thickness of other portions. The hollow body so formed is thereafter blown or gas expanded by one of the described techniques with the portion or portions thereof of greater thickness providing greater resistance to deformation than thinner-walled portions.

(b) Disposing structural members or other stiffening means in the mold used to form the hollow body prior to molding and integrally molding the molding material around or against said stiffening means. When the mold is opened and the body is inflated as described, said stiffening means may serve to restrain part of the molding from expanding to more particularly define the shape thereof and may be used for supporting the molding and fastening thereto once expanded. Reference is made to my copending application Ser. No. 281,306 for certain types of internal stiffening means which comprise structural members or frames disposed across the mold prior to molding which become integrally fastened within the molding, the wall of which may be outwardly bulged or inflated by application of internal gas pressure thereto.

(c) The parison or hollow body to be blown or gas expanded to shape may be formed by injection molding same to shape in a mold which includes means for forming a tubular member closed at one end and open at the other. A pin or mandrel of any suitable shape defines the inside surface of the hollow tubular molding and may be used for inflating the molding after said mandrel with the parison molding disposed thereon has been removed from the mold in which said parison molding has been formed and disposed in a second mold containing a cavity adapted to permit its blowing or inflation to shape. Such a molded parison may be predeterminedly blown to shape wherein such variables as wall thickness, wall material, temperature of different portions of the wall or stiffeners disposed in the mold in which the parison is originally injection molded to shape, are regulated or provided in such manner as to predetermine the wall structure and shape of the resulting blown or inflated articles and/or provide composite articles of rigid and flexible wall or internal supporting portions.

If such an injection molded parison is made of varying wall thickness of a single material and has stiffening ribs, rings, rims or wall portions which are formed of greater thickness than other portions thereof or portions rendered stiffer than others by predeterminedly cooling and/or heating the parison, then gas pressure applied for example through the mandrel, may be used to expand the parison whereby portions of the wall expand greater than other portions due to variations in thickness and rigidity of the wall thereof.

Similarly, by injection molding the parison of a plurality of different molding materials each of a different rigidity, by the process of multiple-shot molding wherein a first part of the molding is first formed and placed thereafter in a second mold or mold part and a second part is molded thereon, the shape or rigidity of the resulting article blown thereafter from said composite parison may be predetermined and regulated. For example, a parison molded of rigid and more flexible formulations of polyethylene, polyvinylchloride, polyurethane, polypropylene or other polymer or metal and a polymer, may be thereafter blown to shape as described for forming a composite article having wall and neck portions of different thickness and different rigidity. The blown flexible portion or portions may be soft and supported or defined in shape by the rigid portions.

(d) In the formation of an article by the means described in (b) above, a parison may be formed by injection molding same on a mandrel. Inflation gas such as air under pressure may be injected through a passageway in the mandrel after disposing same in a new mold having a larger cavity permitting expansion of the walls of the parison. However, a portion of the original mold may be retained against a portion of the mold parison in line with the mandrel to prevent expansion thereof during blowing. Said unexpanded portion may comprise an entire wall of the parison containing, for example, bosses, lugs, bearings, handles or other solid formations which are not desired to be deformed during blowing but to retain their shape as injection molded.

(e) The shape of the parison or otherwise molded hollow body may also be controlled by control of the movement of the mold portions used to shape same during blowing or expansion. One or more portions of the mold may be controllably opened and/or closed during blowing the article so as to affect shape and physical characteristics of the article.

(f) Hollow containers for liquid and particulate material may be formed and filled as follows. A plastic or metal parison with a closed lower end is injection molded on a mandrel in a first mold. The mandrel is moved to a second mold and the neck of the parison is clampingly engaged by walls of the second mold after which gas under pressure is injected through a first passageway in the mandrel to expand the walls of the parison into the shape of the cavity walls of the second mold. Thereafter, the gas is withdrawn through the mandrel and a liquid or other fluid injected into the blown container through the same or a second passageway in the mandrel. Thereafter the blown molding may have the mandrel withdrawn and be capped or filled. Blown container may be closed at the neck portion which has been defined by the mandrel by collapsing and sealing the neck, valve means inserted by the mandrel or other means as described.

In a preferred form of the invention, the contents of the blown container may comprise a product to be dispensed under pressure and a quantity of propellant such as Freon 12, nitrogen gas or the like to dispense same from the container which may be injected before the other. A preferred method of producing such aerosol containers involves injection molding the parison, removing the mandrel therefrom while retaining same in the mold in which it is shaped or otherwise holding same; inserting a second mandrel or plug into the neck of the parison with a valve and long tube held by the second mandrel for dispensing fluid from the container, reheating the parison (if necessary) to render it semi-molten before or after inserting it into a second mold for blowing; blow molding same to the shape of the cavity of the second mold, preferably by injecting the propellant therein, or other fluid such as the contents or air, and sealing a portion of the neck of the parison or blown container to the outer wall of the valve or retainer for the valve inserted therein by the plug or second mandrel so as to totally enclose the contents. Said contents including propellant and liquid to be dispensed may be injected through said valve or an opening defined between the valve or its retainer and the inside wall of the parison or blown container neck prior to collapsing same against the valve or retainer therefor (as described) for sealing same to the neck of the container.

In still another form of the invention the parison used to form the blow molded article may be injection molded in situ against a pre-formed valve assembly or a fitting for retaining same. The valve may include a long tube assembled therewith which is adapted to extend deep within the blown container for drawing liquid from the bottom of the container. The parison with attached valve assembly is thereafter blown to shape in a second mold in which it is placed using a gas such as air or the propellant or liquid contents desired to fill the container to expand the walls of the parison to conform to the cavity walls of the second mold. Filling of the blown container with contents to be dispensed and/or propellant may be effected through the valve attached to the continer neck or an unsealed passageway in the neck or other inlet to the parison or bottle after which said passageway is sealed off as described.

Thermosetting resins may also be injection molded or extruded into parison shapes as described and heated to partially set same while in the mold so formed or aligned with a heated mandrel, to render same in such a cured state or condition as to be capable of being blown to shape thereafter. When such condition is attained, the semi-cured thermosetting resin parison may be blown to shape in a blow mold to which it is transferred or aligned.

I claim:

1. A method for forming and filling containers comprising:

first forming a parison by injection molding a closed end tubular member in a first mold using a removable mandrel to define the inside wall of said parison, removing said mandrel from said parison, positioning a dispensing valve assembly in the neck of said parison, placing said parison in a second mold and clampingly engaging the neck thereof between portions of said second mold and said valve assembly, sealing said neck to said valve assembly, injecting fluid under sufficient pressure to expand said parison into said second mold to form a container, filling said container with contents to be dispensed including a propellant, and closing off the container to maintain the contents therein under pressure.

2. Method in accordance with claim 1 wherein the contents and inflation fluid for the container are injected through said valve inserted positioned in the neck of the container.

3. A method in accordance with claim 1 wherein said valve is normally closed and the contents of said container are injected between the neck of said container and the valve assembly, said method further including closing said container thereafter by compressing said container neck against said valve assembly and sealing same thereto.

4. A method of molding comprising:

(a) disposing a predetermined quantity of molding material in a molten, formable condition in the cavity of a closed mold, (b) causing said molding material to conform to the entire surface of the walls of the mold cavity, and (c) causing said molding material to at least partially set while conforming to the surface of the mold cavity so as to define a hollow object having a wall with a first external shape substantially the shape of the mold cavity walls, (d) gas pressurizing the interior of said hollow object, (e) removing said hollow object from said mold, (f) further expanding the hollow object by means of the gas pressurizing same to predeterminately inflate the walls thereof to a larger size and shape than said first shape defined by the walls of said mold cavity.

5. A molding method in accordance with claim 4, wherein said molding material is provided as a parison, said method further including the step of causing said parison to conform to the surface of the walls of the mold cavity by expanding said molding material against said mold cavity walls.

6. A method of molding comprising:

(a) disposing a predetermined quantity of fluent molding material to partially fill a molding cavity of a multiple part mold, (b) closing said mold, (c) providing a gas in said mold cavity at a pressure above atmospheric pressure, (d) sealing said mold to maintain said gas under pressure, (e) causing the molding material in the mold to become distributed about the wall of the mold cavity and solidifying said molding material in situ thereon to form a hollow body totally surrounding and containing said pressurized gas at a pressure sufficient to predeterminately inflate the walls of the molded article upon its removal from the mold to a size greater than that at which it is molded, and, (f) removing the molded article from the mold and allowing same to inflate and expand.

7. A method in accordance with claim 6 including the step of cooling a portion of said mold so as to cause a portion of the molded article to be at a lower temperature than the remaining portion of said article whereby the portion at lower temperature expands less than the portion at higher temperature when the mold is open.

8. A method in accordance with claim 6 including the step of cooling a portion of said mold to cause a portion of the article molded therein to be at a lower temperature than the remaining portion when the article is removed from the mold whereby said portion of said article at lower temperature does not expand but retains the shape as molded while the remaining portion expands.

9. A method of pressurizing a hollow body comprising:
forming a hollow body with a hollow tubular conduit formation extending inwardly from a wall thereof as an integral extension of said wall,
providing the material of said tubular formation in a flexible semi-molten condition,
disposing an injector nozzle in said tubular conduit,
injecting a fluid through said nozzle into the interior of said body to pressurize said body,
withdrawing said nozzle from said tubular formation in a manner permitting the fluid pressure within said body to collapse said tubular formation and causing the walls of said tubular formation to become welded together by abutment of the semi-molten walls thereof when they solidify to seal off said formation and enclose said fluid under pressure within said body.

10. A method in accordance with claim 9, whereby the material of said tubular formation is rendered semi-molten by applying heat thereto by heating said injection nozzle.

References Cited

UNITED STATES PATENTS

| 2,349,177 | 5/1944 | Kopitke | 264—96 |
|---|---|---|---|
| 2,642,911 | 6/1953 | De Shazor | 264—25 |
| 2,710,987 | 6/1955 | Sherman | 264—98 |
| 2,750,625 | 6/1956 | Colombo | 264—98 |
| 2,812,551 | 11/1957 | Chupa | 264—96 |
| 2,838,798 | 6/1958 | Rekettye | 264—96 |
| 2,898,972 | 8/1959 | Strong | 264—94 |
| 2,991,500 | 7/1961 | Hagen | 264—96 X |
| 3,138,279 | 6/1964 | Meissner. | |
| 3,162,706 | 12/1964 | Cheney | 264—97 |
| 3,172,929 | 3/1965 | Santelli | 264—97 |
| 3,204,959 | 9/1965 | Nicholls | 264—275 X |

FOREIGN PATENTS 1,134,820   8/1962   Germany.

ROBERT F. WHITE, *Primary Examiner.*

A. R. NOE, *Assistant Examiner.*